(12) United States Patent
Kojima

(10) Patent No.: US 7,924,326 B2
(45) Date of Patent: Apr. 12, 2011

(54) IMAGE QUALITY ADJUSTMENT PROCESSING DEVICE

(75) Inventor: Takayoshi Kojima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 356 days.

(21) Appl. No.: 12/210,015

(22) Filed: Sep. 12, 2008

(65) Prior Publication Data

US 2009/0079852 A1    Mar. 26, 2009

(30) Foreign Application Priority Data

Sep. 21, 2007  (JP) .................................. 2007-245397

(51) Int. Cl.
*H04N 5/77* (2006.01)
*H04N 5/225* (2006.01)

(52) U.S. Cl. ................................ 348/231.6; 348/333.04

(58) Field of Classification Search ............. 348/231.99, 348/231.3, 231.6, 333.02, 333.04, 333.11, 348/333.12

See application file for complete search history.

(56) References Cited

U.S. PATENT DOCUMENTS

| | | | | |
|---|---|---|---|---|
| 7,362,354 B2* | 4/2008 | Lin | | 348/333.04 |
| 7,742,083 B2* | 6/2010 | Fredlund et al. | | 348/231.2 |
| 7,872,675 B2* | 1/2011 | Levien et al. | | 348/231.3 |
| 2005/0212914 A1* | 9/2005 | Seto et al. | | 348/207.1 |
| 2006/0017820 A1* | 1/2006 | Kim | | 348/231.2 |
| 2006/0023273 A1* | 2/2006 | Kato | | 358/519 |
| 2006/0279636 A1* | 12/2006 | Sasaki | | 348/207.2 |

FOREIGN PATENT DOCUMENTS

| | | |
|---|---|---|
| JP | 2002-314809 | 10/2002 |
| JP | 2002-314834 | 10/2002 |
| JP | 2003-250056 | 9/2003 |
| JP | 2006-093757 | 4/2006 |
| JP | 2006-234869 | 9/2006 |
| WO | WO 02/086821 A1 | 10/2002 |

* cited by examiner

*Primary Examiner* — Jason Whipkey
(74) *Attorney, Agent, or Firm* — DLA Piper LLP (US)

(57) ABSTRACT

An image processing device capable of executing adjustment of image quality of image data includes a feature amount obtainment unit which obtains an amount of feature indicative of a feature of image quality of the image data, a correction amount obtainment unit which obtains an amount of correction for adjusting the feature amount of the image data to a predetermined target value, and an image quality evaluation unit which evaluates an image quality based on the correction amount.

6 Claims, 7 Drawing Sheets

CASE OF EVALUATION THRESHOLD 60

| | JPEG | RAW | INDEX | TARGET TO BE PROCESSED |
|---|---|---|---|---|
| FILE GROUP A | PRESENT | ABSENT | 80 | JPEG |
| FILE GROUP B | PRESENT | PRESENT | 60 | JPEG |
| FILE GROUP C | PRESENT | PRESENT | 55 | RAW |
| FILE GROUP D | ABSENT | PRESENT | 40 | RAW |
| FILE GROUP E | PRESENT | ABSENT | 20 | NONE |
| FILE GROUP F | PRESENT | ABSENT | 95 | JPEG |
| FILE GROUP G | PRESENT | ABSENT | 87 | JPEG |
| FILE GROUP H | PRESENT | ABSENT | 76 | JPEG |
| FILE GROUP I | ABSENT | PRESENT | 51 | RAW |
| FILE GROUP J | PRESENT | ABSENT | 40 | NONE |

FIG.5

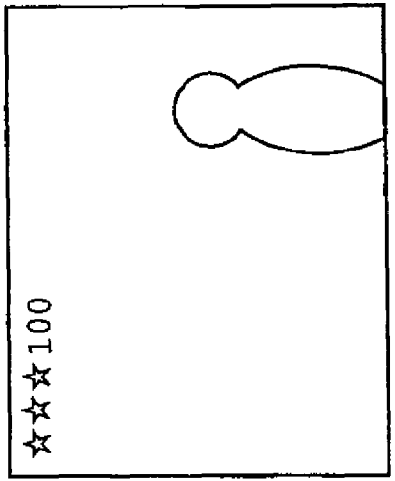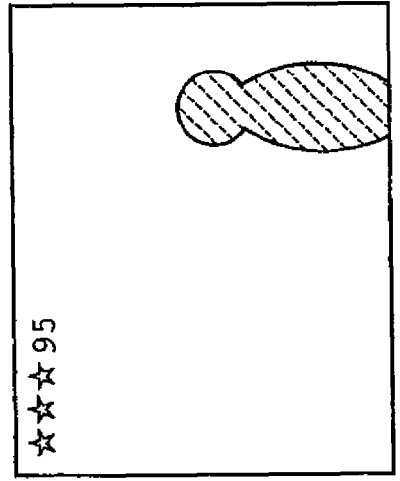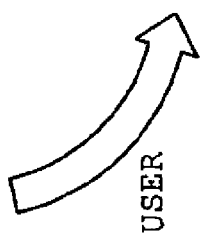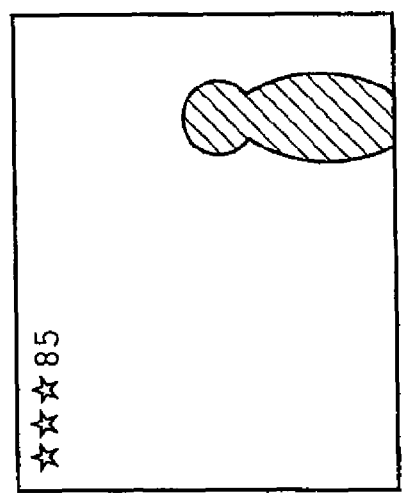
FIG. 7

IMAGE QUALITY ADJUSTMENT PROCESSING DEVICE

The entire disclosure of Japanese Patent Application No. 2007-245397, filed on Sep. 21, 2007, is expressly incorporated by reference herein.

BACKGROUND

1. Technical Field

The present invention relates to an image processing device, a method of image processing and an image processing program, and more particularly, to such an image processing device, method and program each of which is capable of carrying out an image quality adjustment of image data.

2. Related Art

It has conventionally been known that in adjustment of image quality, a user adjusts or corrects an image while viewing the image displayed on a screen. Alternatively, it has been known that an automatic correction is carried out to achieve a previously determined target value of image quality or a target value of image quality obtained from results of analysis of image data. For example, see Japanese published patent applications, JP-A-2002-314809, JP-A-2002-314834 and JP-A-2003-250056. In the aforesaid automatic correction, results of automatic correction are displayed on a screen so that the user can confirm the results. Furthermore, a technique of comparing images to determine a degree of similarity is also known. For example, see published international patent application, WO2002/86821.

However, since the image adjustment depends upon every user's preference, an image automatically adjusted cannot correspond to an original image completely. However, even when the user tries to carry out automatic adjustment by retouching based on his/her preference, he/she does not know how an automatic adjustment should be carried out. Accordingly, providing guidelines of image quality adjustment has been desired. Furthermore, even though results according to the user's preference are displayed on a display irrespective of automatic adjustment and retouching, printing results sometimes differ from the displayed results. Accordingly, provision of indexes has been desired as to whether printing results correspond to desired results.

On the other hand, in digital still cameras (DSC), the capacity of storage medium has recently been increased with cost reduction in storage elements. Consequently, the increased capacity of storage medium results in a problem of data reduction of a large amount of photos though photos can be taken more easily. A choice needs to be made among a large amount of image data according to good or poor results. Accordingly, provision of indexes has been desired as to whether a choice is made among a large amount of image data.

Furthermore, in digital still cameras (DSC), data is generally stored using a file format in which processes of de-mosaicing and data compression have been executed, such as a joint photographic experts group (JPEG). However, use of a RAW format has been increased for the purpose of increasing the freedom in retouching. A RAW file has a characteristic that a relatively finer result can be achieved when image processing or the like, for example, image correction is carried out therefor. On the other hand, a JPEG file has a characteristic that an image cannot be corrected as fine as the RAW file but the image can be processed at higher speeds. Since the RAW and JPEG files thus differ in the image processing characteristic, the user should select a suitable file format in accordance with processing or purposes. There is no problem when either JPEG or RAW format is used. However, when both formats are usable, users are bewildered by selection of either one of file formats regarding an object to be stored and an object to be processed. Accordingly, when image data can be stored using a plurality of file formats, provision of indexes has been desired as to what file format should be selected.

SUMMARY

At least one of the above-described problems can be overcome by providing indexes for image quality adjustment for obtainment of ideal image quality. An advantage of some aspect of the invention is to provide an image processing device, a method of image processing and an image processing program each of which can provide guidelines for image quality adjustment of an image file by evaluation based on an image quality of image file.

In one aspect of the invention, an image processing device is capable of executing adjustment of image quality of image data and comprises a feature amount obtainment unit, a correction amount obtainment unit, and an image quality evaluation unit.

In the foregoing arrangement, the feature amount obtainment unit obtains an amount of feature indicative of a feature of image quality of the image data. The correction amount obtainment unit obtains an amount of correction for adjusting the feature amount of the image data to a predetermined target value. The image quality evaluation unit evaluates an image quality based on the correction amount. The feature amount indicative of the image feature is, for example, a parameter corresponding to a parameter value adjusted in various image quality adjusting process and is generated from image data. More specifically, for example, a histogram is made based on the image data and the parameter is generated from the histogram. Alternatively, the parameter is generated by analysis of spatial frequency of image data.

The target image quality value is an image parameter which renders an output result of image optimum. The image output result is previously determined by an image analysis by fixed quantity evaluation and sensory evaluation. The amount of correction is a parameter of image quality adjustment and is used to correct the feature amount into a target image quality value. Furthermore, the aforesaid evaluation is carried out based on the correction amount. Alternatively, the evaluation may be carried out using a correction amount weighted by a degradation level of image quality according to a type of image quality adjusting process. More specifically, an index of correction tolerance for the image file is provided. Furthermore, for example, when an evaluation value is obtained by subtraction from a value indicative of no image quality degradation, it means that the image quality is degraded as the value is reduced from the value indicative of no image quality degradation. Consequently, the user can easily comprehend the evaluation.

In a selective aspect of the invention, when a file group includes at least JPEG data and RAW data both derived from same image data, the feature amount obtainment unit obtains a feature amount based on the JPEG data. The image processing device further comprises a file selection unit which selects the JPEG data as a target to be output when a result of evaluation by the image quality evaluation unit is higher than a predetermined level. The file selection unit selects the RAW data as a target to be output when a result of evaluation by the image quality evaluation unit is lower than the predetermined level.

In the above-described arrangement, the JPEG data is processed at least by a de-mosaicing process and a process of data compression and generally has a smaller bit depth than the RAW data. Accordingly, when an evaluation generated on the basis of the obtained feature amount is lower than the predetermined level, RAW data which has a higher resistance to image quality adjustment is selected as the output target. More specifically, when there is less possibility of image quality deterioration even if image quality is adjusted on the basis of JPEG data, the JPEG data used by a larger number of users and with a smaller capacity. On the other hand, RAW data is selected when adjustment of image quality of JPEG data would result in an intense deterioration of image quality.

In another selective aspect of the invention, the image processing device further comprises a user correction amount storage unit which stores a user amount of correction based on a result of retouch with the image data by the user and a target value modification unit which modifies the target image quality value based on the user correction amount.

In the foregoing arrangement, the result of retouch or correction actually made by the user is reflected in the target image quality value. Consequently, user's preference can be reflected in both the result of evaluation executed by the feature amount obtainment unit, the correction amount obtainment unit and the image quality evaluation unit and the image quality adjustment carried out using the correction amount obtained by the correction amount obtainment unit.

In further another selective aspect of the invention, the file selection unit selects as a target to be output a file regarding which a result of evaluation is in a predetermined range. More specifically, image data evaluated as more suitable and another image data evaluated as lower are sorted according to the result of evaluation. Sorting includes differentiating storage locations according to evaluation and canceling image data evaluated as lower, for example. Consequently, convenience for users who would like to sort files on the basis of image quality can be improved.

In further another selective aspect of the invention, the image processing device further comprises a display unit which displays a result of evaluation by the image quality evaluation unit together with the image data. The displayed image data may be adjusted or unadjusted by the use of the aforesaid correction value Alternatively, both adjusted and unadjusted data may be used. As a result, when image data is corrected so as to correspond with the predetermined target image quality value, the user can view both the evaluation as to how much image deterioration occurs and the image. While considering the viewed evaluation, the user can determine whether an actual processing should be carried out. Furthermore, the user can carry out the retouching process so that such an image quality adjustment that image deterioration is not worsened is carried out. Thus, the user's determination can be assisted.

In further another selective aspect of the invention, the correction amount obtainment unit obtains the correction amount for every type of image quality adjustment, and the image quality evaluation unit weights a degree of image degradation due to each image quality adjustment to each correction amount and sums each correction amount weighted by the image degradation degree, thereby comprehensively evaluating the image quality after image adjustment. The aforesaid type of image quality adjustment includes, for example, level correction, tone curve correction, sharpness adjustment, contrast adjustment and noise reduction. More specifically, even when a plurality of types of image adjustment manners are necessitated, the image quality evaluation unit weights a degree of image deterioration due to each image quality adjustment to each correction amount and sums the correction amounts weighted by the image deterioration degree, thereby obtaining a comprehensive degree of influence. Consequently, a correction index is provided in the case where all the necessary image adjustment manners have been executed as well as evaluation for every type of image quality.

The above-described image processing device may be incorporated in other equipment for implementation thereof or may be implemented together with another method. Thus, the image processing device includes various forms of implementation. Furthermore, the present invention can be practiced as an image processing system provided with the foregoing image processing device, a control method having a process corresponding to the above-described arrangement of the image processing device, a program which causes a computer to realize functions corresponding to the above-described arrangement of the image processing device, a computer-readable recording medium on which the aforesaid program is recorded, and the like. The above-described operation and advantages can also be achieved by the invention of each of the image processing system, the image processing method, the image processing program and the medium on which the program is recorded. Of course, the arrangement described in each of claims 2 to 6 is also applicable to the above-described system, method and recording medium.

BRIEF DESCRIPTION OF THE DRAWINGS

In the accompanying drawings:

FIG. 5 illustrates a manner of selecting a file to be filed on the basis of the index and the configuration of file groups;

FIG. 7 shows a case where the result of retouching and the target value differ from each other.

DESCRIPTION OF EXEMPLARY EMBODIMENTS

A. Arrangement of Image Processing Device

Figure 1:
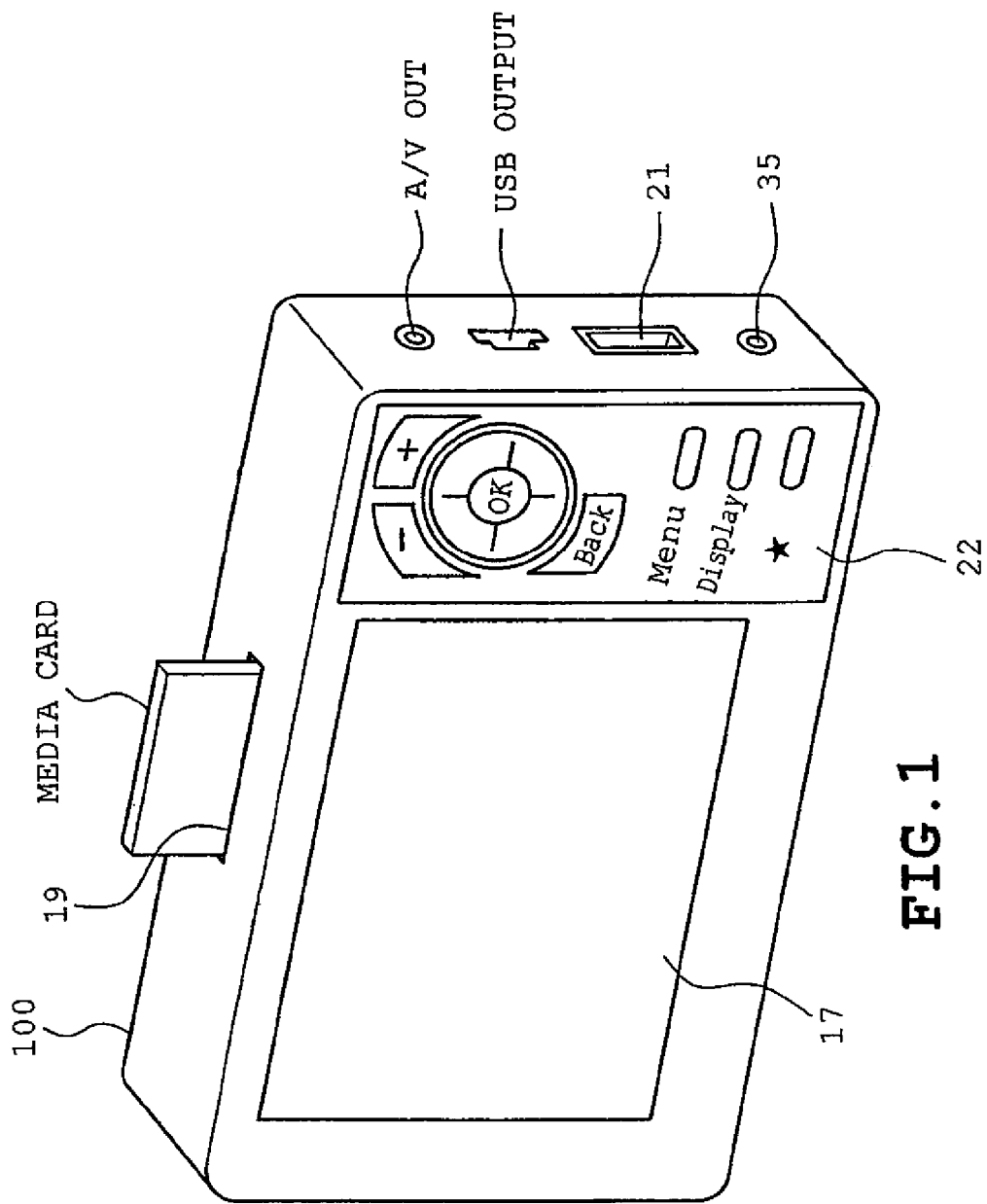
FIG. 1 is a perspective view of a photo storage viewer (PSV) of one embodiment in accordance with the present invention.
Figure 2:
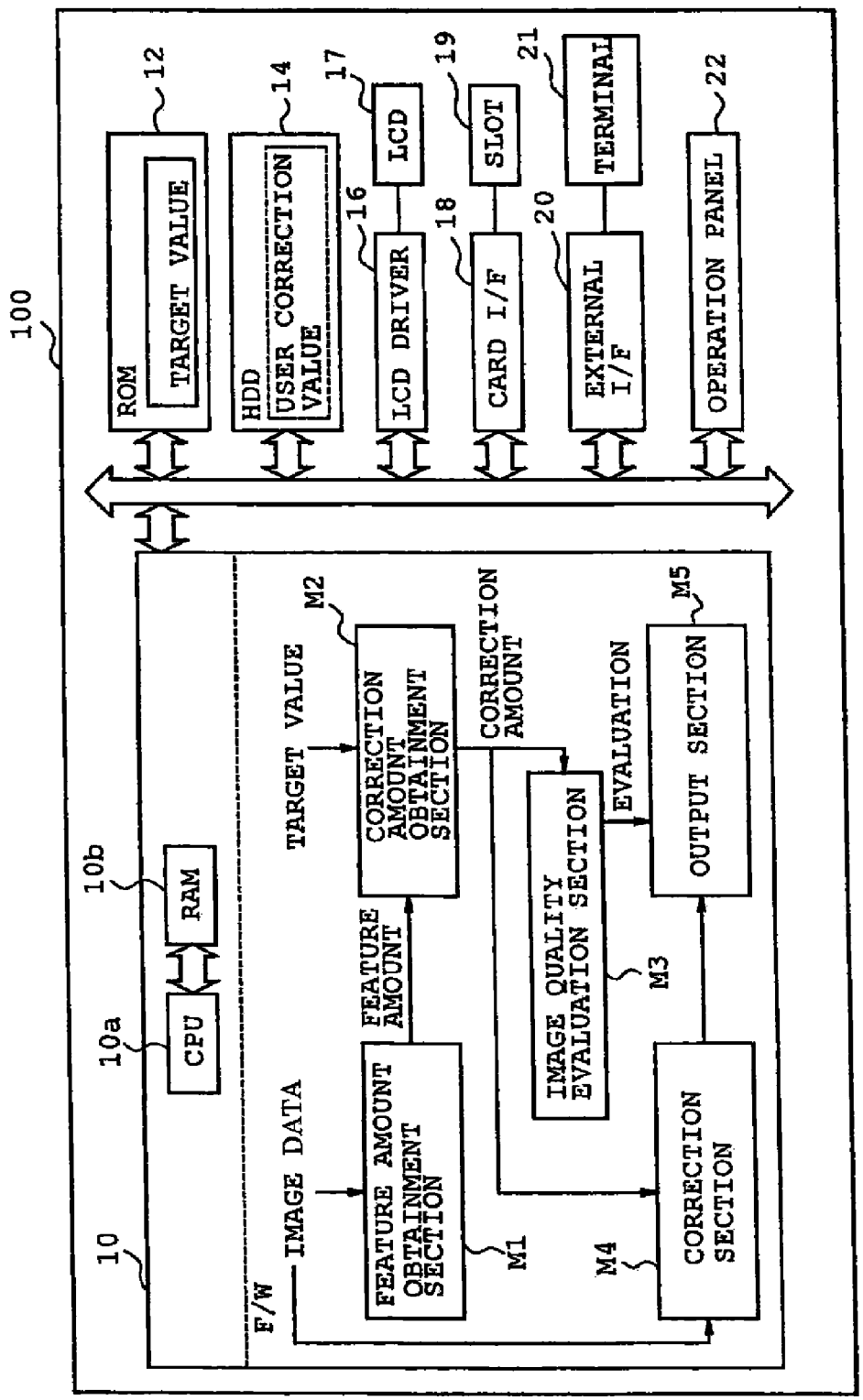
FIG. 2 is a block diagram showing an electrical arrangement of the PSV.

Referring first to FIGS. 1 and 2, the arrangement of an image processing device of the embodiment will be described. The invention is applied to a photo storage viewer (PSV) in the embodiment. Of course, the invention should not be limited to the PSV but is applicable to various types of equipment in which an image quality adjusting process is carried out, such as a photo printer which carries out printing for input image data, a digital still camera taking or reproducing a picture, a retouch application and the like.

FIG. 1 shows an appearance of the PSV 100. As shown, the PSV 100 comprises a liquid crystal display 17 mounted on a side of the body, an operation panel 22 mounted on the same side as the liquid crystal display 17, an input terminal (terminal 21), a power supply terminal 35, a memory card (Smart Media, Compact Flush®, Multimedia Card®, xD-Picture Card, Memory Stick, etc.) inserted in a slot 19 so that data is read from and written onto the memory card.

The PSV 100 designates and reads an image file stored in an image processing device connected to the input terminal or on the memory card inserted in the slot or an image file stored on a built-in storage medium, saving the read image file. Furthermore, the PSV 100 carries out decoding and an image adjustment process for the saved or read image file in order to display the image file on the liquid crystal display.

Referring to FIG. 2, an electrical arrangement of the PSV 100 is shown. As shown, the PSV 100 comprises a central processing unit (CPU) 10a, a random access memory (RAM) 10b, a read only memory (ROM) 12, a hard disc drive (HDD) 14, a liquid crystal display driver 16, the liquid crystal display 17, a card interface 18 (card I/F), the slot 19, an external equipment connecting interface 20 (external I/F) and the operation panel 22. The HDD 14 comprises a nonvolatile storage medium. The PSV 100 is connectable via the card I/F to the memory card inserted in the slot 19. Additionally, the PSV 100 is also connectable to external equipment such as a digital still camera connected via a predetermined cable to the external I/F.

The CPU 10a and the RAM 10b constitute a control section 10 of the PSV 100. The control section 10 executes various programs stored on the ROM 12 and the HDD 14 while using the RAM 10b as a work area. In the embodiment, the control section 10 reads and executes firmware (F/W) stored on the ROM 12. The firmware to be executed roughly includes a feature amount obtainment section M1, a correction amount obtainment section M2, an image quality evaluation section M3, a correction section M4 and an output section M5. The sections M1 to M5 serve as a feature amount obtainment unit, a correction amount obtainment unit, an image quality evaluation unit, a correction unit and an output unit in the invention respectively.

The feature amount obtainment section M1 converts image data to RGB data and analyzes the RGB data to obtain a feature amount indicative of an image quality feature. For example, the feature amount obtainment section M1 generates statistic values of luminance, saturation, hue, spatial frequency distribution and the like from the RGB data. The feature amount obtainment section M1 further generates a feature amount of image data based on the statistic values. Since the F/W is intended to be provided with a JPEG decoder in the embodiment, image data to be analyzed uses JPEG data or RGB data in the following description. However, any image format provided with a decoder may be used as an object to be analyzed.

The correction amount obtainment section M2 obtains a correction amount for image adjustment based on comparison of the feature amount and an image quality target value. The image quality target value is an image parameter which renders an image output result optimum. The image output result is previously determined by an image evaluation by quantitative analysis and sensory evaluation. Furthermore, the correction amount is an image quality adjustment parameter for correcting the feature amount to the image quality target value. More specifically, when image adjustment is carried out based on the correction value obtained by the correction amount obtainment section M2, the feature amount of image data is corrected so as to correspond with the image quality target value.

The image quality evaluation section M3 evaluates a quality of image to which image quality adjustment has been applied, based on the correction amount. The evaluation is based on the correction amount obtained by the correction amount obtainment section M2. A value weighted according to a type of image quality adjustment is used as an image quality evaluation parameter. When a plurality of types of image quality adjustment processes are carried out, the image quality evaluation section M3 can carry out weighting of the image quality adjustment parameters according to the types of image quality adjustment processes and adds the weighted values to the image quality adjustment parameters respectively. Thus, the image quality evaluation section M3 can carry out a comprehensive evaluation. More specifically, contribution to the evaluation becomes larger as a degree of image quality deterioration in each image adjustment process is high. A degree of image quality deterioration is obtained in the case where image quality of image data is adjusted so as to correspond with the image quality target value. As a result, an index of resistance to correction of image file is obtained. Of course, a correction amount of a single image adjustment process can be evaluated.

The correction section M4 corrects image data using the correction amount obtained by the correction amount obtainment section M3. However, when the image data obtained by the correction amount obtainment section M3 differs in the number of pixels from image data to be actually corrected, modification according to the difference in the number of pixels needs to be carried out. For example, in a case such as sharpness correction, computation is carried out in the image quality adjustment process to fold influences of peripheral pixels in a pixel to be corrected. In this case, a range of peripheral pixels to be folded in is adjusted or a degree of influence by the peripheral pixels is adjusted.

The output section M5 delivers data to a printer and the liquid crystal display 17. For example, in a process of displaying on the liquid crystal display 17, a scaling process is carried out so that the number of pixels of image data to be displayed is caused to correspond with the number of pixels in a display size. Furthermore, evaluation obtained by the image quality evaluation process is superimposed on the image data when displayed.

B. Image Saving Format

The following describes a saving format for image data imaged by a single-plate color image sensor in which each pixel has information of a single color. The single-plate color image sensor is realized as a charge-coupled device (CCD) or a complementally metal oxide sensor (CMOS) and will be referred to as "single-plate sensor." A DSC employing the single-plate sensor will be described in the following description.

The DSC takes anyone of RGB colors using each pixel. Accordingly, image data initially generated by the DSC is RAW data in which each one of pixels arranged in a matrix or the like possesses color information about a single color. Uncompressed RAW data has a large data size, and color information of each pixel is deficient. Accordingly, a de-mosaicing process and a compressing process are generally executed for the RAW data so that the data is saved by the use of a general-purpose format such as JPEG or TIFF. However, the number of types of PSVs allowed to save the RAW data having a high level of freedom in retouch as well as the JPEG file which is acceptable to a large number of devices and a large amount of software are increasing with price reduction of storage media. Furthermore, some types of PSVs are allowed to save only RAW file, and JPEG data for preview is embedded in RAW file in other types of PSVs The JPEG data embedded in the RAW file have different sizes according to specifications of manufacturers and ranges from a small size for preview to the same size as RAW data.

In view of the above-described actual condition, an image file taken by a DSC is sometimes saved as a file group in which both as a JPEG file and a RAW file both of which are co-related with each other. Of course, the file group should not be limited to the JPEG file and RAW file. A plurality of types of image data derived from the same RAW data may be organized into one. Alternatively, a plurality of files may be saved in a co-related state. These files differ from each other in at least one of resolution, the number of pixels, execution of compression, saving format, degree of image quality adjustment, execution of image quality adjustment and execution of RAW development. Additionally, the aforesaid file group can include RAW data.

Figure 3:
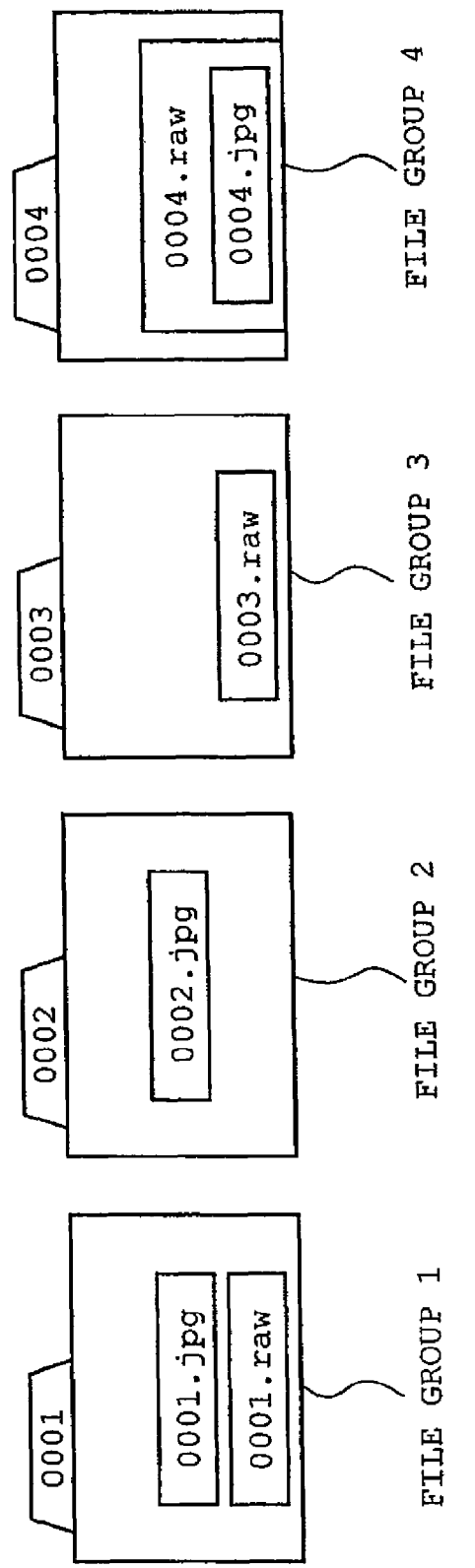
FIG. 3 schematically illustrates file groups.

FIG. 3 shows file groups, in which figure files belonging to the same file group are labeled by the same file name and extensions are used for identification of the files in each file group. In FIG. 3, file group 1 includes a JPEG file and a RAW file. File group 2 includes only a JPEG file. File group 3 includes only a RAW file. File group 4 includes a RAW file in which a JPEG file is embedded.

A file group generated by the same type of DSC is basically generated and saved in accordance with specifications unified to one of file groups 1 to 4. However, when a type of DSC that can selectively switch between save in RAW file and save in JPEG file, there would be a case where a plurality of types of file groups are mixed. Furthermore, when data is transferred from a DSC to a personal computer (PC) in order that retouch or print, there would be a case where data transferred from a plurality of types of DSCs are mixed.

As described above, when both RAW and JPEG are saved, the user is at a loss which to be selected as a target to be saved and a target whose image quality is to be adjusted. For example, a JPEG file is preferred when the image adjustment is accompanied by slight image quality deterioration. On the other hand, when necessary image quality adjustment is accompanied by large image quality deterioration, an RAW file with a large bit depth is preferred in order that image quality deterioration may be reduced. However, the user has a difficulty in determining to what degree image quality should be adjusted. In addition, when a large number of files are saved, the user necessitates an enormous work to view all the images to select one or more desirable files. In view of these conditions, the following index obtaining process is carried out so that a resistance to image quality adjustment is evaluated regarding each image file. The result of evaluation is notified to the user whereupon burden imposed on the user is reduced and an automatic selecting process is carried out according to the result of evaluation.

C. Index Obtaining Process

Figure 4:
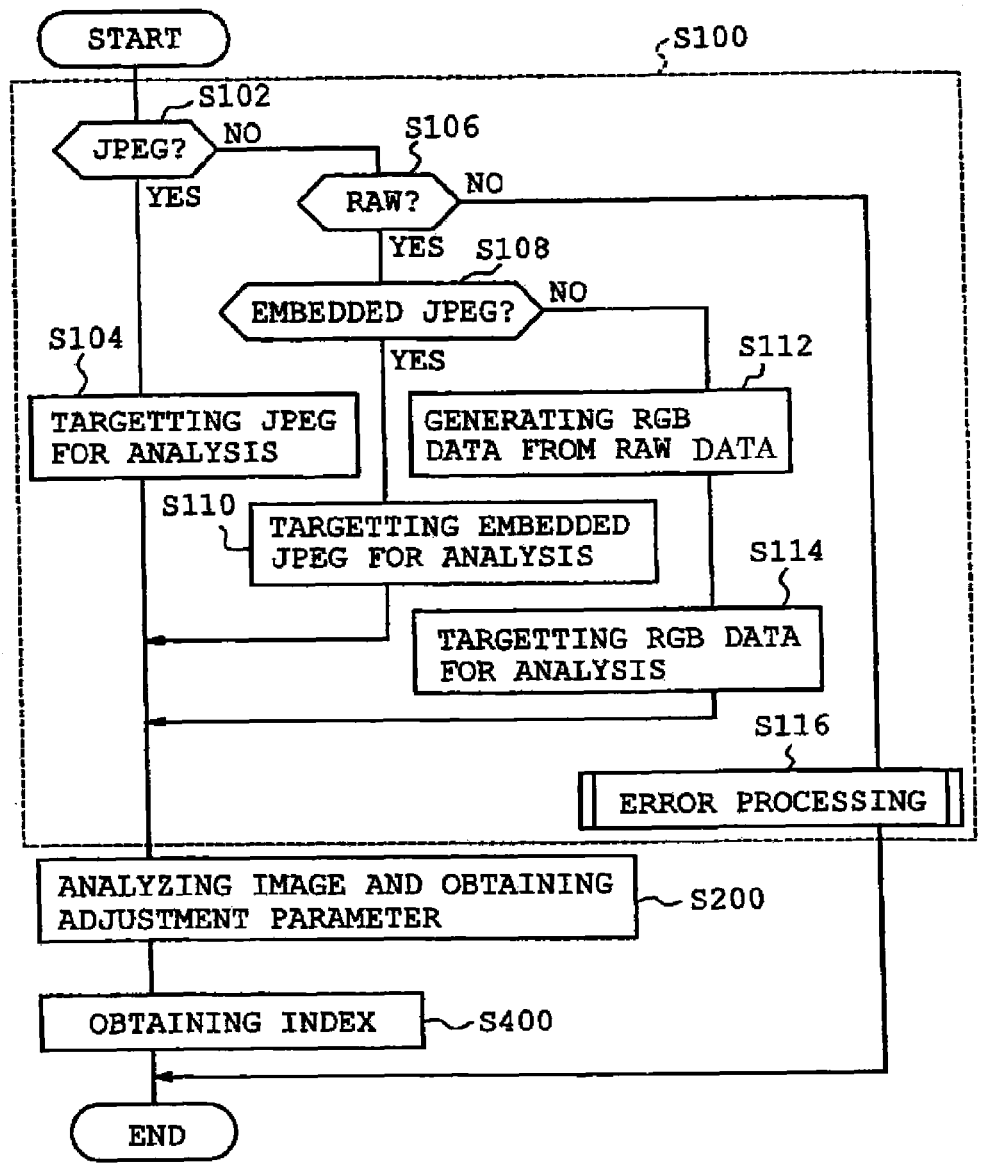
FIG. 4 is a flowchart showing an index obtaining process.

Referring to the flowchart of FIG. 4, a process of obtaining an index of each file group will be described. In the index obtaining process, image data is analyzed by an automatic correcting function, for example, and a correction amount is generated which is necessitated to approximate each parameter of the image data to a reference value, whereby an index of the image data is obtained. The aforesaid reference value is a target value of parameter which renders the output result of a predetermined image optimum by image evaluation including a quantitative evaluation and a sensory evaluation. Furthermore, the index evaluates the image quality of an image constituting each file group. For example, the index represents a degree of retention of image quality in the case where image data is corrected so as to correspond with a target value.

The aforesaid index obtaining process may be carried out independently or may be accessed to be carried out during a printing process, displaying process, file saving process, file transferring process, file selecting process or the like. Thus, the index obtaining process is used when image data to be processed is selected from a plurality of image data. Furthermore, the index obtaining process may be accessed in a retouching process so that an index of image to be processed is obtained. In this case, a retouch application may display the obtained index so that the displayed index serves as a criterion of judgment by the user. Of course, the index obtaining process may be carried out every time an image file is generated. When the generated indexes are saved so as to correspond to the respective image files, the saved indexes may be reused in a printing process, displaying process, data transferring process, selecting process or the like. In this case, the index obtaining process need not be carried out.

Upon start of the index obtaining process, the control section 10 advances to step S100 to select an image to be analyzed. A JPEG file is given priority when included in the image to be analyzed, whereas election priority of a RAW file is rendered lowest. More specifically, a top priority is given to an image file whose format is used widest, and the election priority is rendered lowest regarding a RAW file which necessitates an RGB data generating process (de-mosaicing, gamma correction or the like) before analysis.

The processing at step S100 is carried out in more concrete forms at steps S102 to S116. Firstly, the presence or absence of a JPEG file is determined at step S102. More specifically, it is determined whether the image to be analyzed includes a file group of the type belonging to a file group 1 or 2 in FIG. 3. When the file group includes a JPEG file, the control section 10 advances to step S104 to designate the JPEG file as an image to be analyzed. On the other hand, when the file group includes no JPEG file, the control section 10 advances to step S106.

At step S106, it is determined whether a RAW file is present or not. The control section 10 advances to step S108 when a RAW file is present in a file group. When no RAW file is present in the file group, the control section 10 advances to step S116 to carry out an error handling, terminating the process. However, when a format other than the JPEG is expandable to RGB data, a determination branch may be provided between steps S102 and S106 to determine whether another file format is present or not. When another file format is present, the file format is designated as an image to be analyzed.

At step S108, it is determined whether JPEG data is embedded in a RAW file. More specifically, it is determined whether a RAW file belongs to file group 4 in FIG. 3. Thus, the embedded JPEG image is given a higher priority than a RAW file. The reason for this is that the JPEG image is provided with a decoder as described above. However, RAW data may be given a higher priority when convertible to RGB data at high speeds. When JPEG data is embedded in the RAW file, the control section 10 advances to step S110 to designate the JPEG data as an image to be analyzed. On the other hand, the control section 10 advances to step S112 when no JPEG data is embedded in a RAW file.

At step S112, at least a de-mosaicing process is carried out so that RAW data is converted to RGB data (RAW development). However, the de-mosaicing process of RAW development to be carried out at this step may be simplified. Data raw-developed at this step is not actually used for display or print purpose but is used for obtaining a parameter of the image to be analyzed. At step S114, RGB data generated from RAW data is set as the image to be analyzed.

When the image to be analyzed has been set as described above, the control section 10 advances to step S200 where the image is analyzed and an adjusting parameter used in each image quality adjusting process is generated. The adjusting parameter is generated as follows, for example.

(a) Regarding contrast, shadow and highlight, a shadow point and a highlight point are detected in image data, serving as level correction values based on respective reference values. A degree of extension of the luminance histogram serves as a parameter. Furthermore, a tone curve correction value is employed as an adjustment parameter and corrects a luminance standard deviation into a reference value.

(b) Regarding luminance, whether an image is dark (underexposure) or bright (overexposure) is determined on the basis of a luminance value obtained by computation from nine divided regions of image data. A tone curve correcting the luminance into a reference value is employed as an adjustment parameter.

(c) Regarding color balance, a deviation of color balance is analyzed from each of histograms of R, G and B components of the image data. A correction value which corrects a tone curve of each of R, G and B components is employed as an adjustment parameter.

(d) Regarding saturation, distribution of saturation of the image data is analyzed. A correction value which emphasizes saturation in a reference value is employed as an adjustment parameter. Accordingly, a level of saturation emphasis is increased as image data has a lower saturation.

(e) Regarding sharpness, a frequency and edge strength distribution of image data are analyzed. An unsharpness mask based on a reference value is employed as an adjustment parameter. The reference value is determined on the basis of a frequency distribution. The reference value is rendered smaller as the frequency of image data is high (scenery or the like), and the reference value is rendered larger as the frequency of image data is low (portrait). Furthermore, an applicable amount of unsharpness depends upon the edge emphasis distribution and is increased when the image data has a characteristic of blurriness.

(f) Regarding memory colors such as skin color, green, sky blue and the like, a corresponding image layer is extracted from image data. A correction value is set as an adjustment parameter so that the extracted image layer becomes a preferable color (target value).

A target image quality (a reference value and a target value) of the above-described adjustment parameters should not be limited to one type but may be prepared for every type of image such as portrait and landscape.

Each of the aforesaid reference values may be one predetermined value designated or a predetermined range designated. For example, in the case of memory colors, a target value of skin color is fixed as $L^*=70$, $a^*=20$ and $b^*=20$ in a color space of $L^*a^*b^*$, a target value of green is fixed to a hue of 120° and a target value of sky blue is fixed to a hue of 260°. Accordingly, the adjustment parameters become correction values for execution of image quality adjustment to the fixed target values.

On the other hand, when the target values have respective ranges, for example, a target value of the hue of the skin color ranges from 20° to 70°, a target value of the saturation ranges from 10% to 50% and a target value of the luminance ranges from 40% to 90%. A target value of the hue of green ranges from 100° to 150° and a target value of the saturation of green is at or above 20%. A target value of the hue of sky blue ranges 240° to 270°. A target value of the saturation of sky blue is at or above 20%. Accordingly, no correction is carried out when the corresponding image layer has a color within the ranges. When the color is out of but near to the ranges, the color can be adjusted by slight correction so as to come within a target range. More specifically, a plurality of image data are not corrected so as to have a standardized coloring, but a result of correction reflects the coloring of original image data. Furthermore, an amount of correction can be prevented from being increased more than necessary, and each image quality adjustment process has only small influence on the entire image.

At step S300, the image quality evaluation unit obtains an index of image quality adjustment based on the adjustment parameters obtained at step S200. Degrees of image deterioration differ from each other according to the characteristics of the respective processes. As a result, the indexes need to be obtained in view of the degrees of image quality deterioration in each process. Consequently, each amount of correction (a, b, c, d, . . . ) is multiplied by a degree of image quality deterioration thereof (A, B, C, D, . . . ) as weighting so that a score (score=100−(aA+bB+cC+dC+ . . . ) is obtained under the condition that each correction amount is normalized by 100. The score serves as an index indicative of a degree of image quality deterioration. Of course, a manner of obtaining the index should not be limited to the above-described addition of weighted correction amount. The score may be obtained by any other method.

More specifically, as the index becomes high, the image quality can be adjusted to a target value without image quality deterioration. As the index is lower, the image quality is deteriorated to a large degree when adjusted to a target value. In notifying the index to the user, when the score ranges from 90 to 100, it may be determined that almost no deterioration is found. In this case, indication "☆☆☆" may be displayed as the index. When the score ranges from 60 to 80, it may be determined that little deterioration is found. Indication "☆☆" may be displayed as the index. When the score ranges from 50 to 60, it may be determined that deterioration is sometimes noticeable. Indication "☆" may be displayed as the index. When the score ranges from 0 to 5, it may be determined that deterioration will occur. In this case, no indication is displayed as the index.

In obtaining the score, for example, the weight of sharpness causing a high degree of image quality deterioration is generally set higher, whereas the weight of contrast causing a low degree of image quality deterioration is set lower. More specifically, consider the case where the level correction has the weight of "2", the tone curve also has the weight of "2", the sharpness has the weight of "3", the contrast has the weight of "1", the noise reduction has the weight of "2" and the like. In this case, amounts of correction of the sharpness, tone curve, sharpness, contrast and noise reduction are "2", "4", "3", "0" and "3" respectively, the score is obtained as score=100−(2×2+2×4+3×3+1×0+2×3)=73. As a result, when a target value is corrected, little deterioration is found. Indication "☆☆" is displayed as the index.

D. Output Process Using Obtained Index

The index obtained by the image quality evaluation section as described above is utilized in various processes. For example, the index is utilized in file input/output processes including processes for printing, displaying on the display, saving a file from another apparatus or recording medium to the PSV 100, transferring a file from another apparatus or recording medium and discriminating between necessary and unnecessary files. More specifically, in these processes, the control section selects a file to be processed based on whether the index obtained by the aforesaid index obtainment process is at or above a threshold and whether the file group contains a RAW file.

FIG. 5 shows an example of selecting a file to be processed on the basis of an index and file group composition. In the shown example, the threshold is set to 60 in order that a file with low image deterioration may be selected as a file to be processed. However, the threshold may selectively be set to any value by the user. In FIG. 5, a file to be processed is determined as one of the following determinations (a) to (d) by the program (a file selection unit) executed by the control section 10:

(a) A JPEG file is selected as a file to be processed in the file groups A, B, F, G and H when an index obtained on the basis of the JPEG file is at or above the threshold of 60;

(b) A RAW file is selected as a file to be processed regarding the file group C containing a RAW file when an index obtained on the basis of the JPEG file is below the threshold of 60;

(c) No selection is executed regarding the file group E or J containing no RAW file when an index obtained on the basis of the JPEG file is at or above the threshold of 60; and (d) A RAW file is selected as a file to be processed regarding the file group D or I containing a RAW file when an index is obtained on the basis of the RAW file. This determination is based on the consideration that a RAW file has a possibility of improvement in an index by improvement in the resistance to image quality adjustment depending upon RAW development. Of course, no selection may be executed.

The aforesaid process is carried out regarding the file which has been selected as a file to be processed. For example, in a printing or displaying process, image quality adjustment is carried out by a correction amount obtained by the correction amount obtainment section and thereafter imaging or printing is carried out. Consequently, only the image is printed or displayed that has been adjusted to have preferable coloring and luminance without image deterioration.

Furthermore, only the file to be processed is transferred to a forwarding destination in the transferring process. Additionally, the destination to save is changed between a file to be processed and the remaining file or files, or the remaining files are deleted. Consequently, a discrimination is made between a fine image or an image modifiable into a fine image (a file which is adjustable to preferable coloring or luminance without image deterioration) and an image which is difficult to correct into a fine image (a file results in image deterioration when adjusted to have preferable coloring or luminance), whereupon the user can be assisted in the selection of one or more images to be saved.

Figure 6:
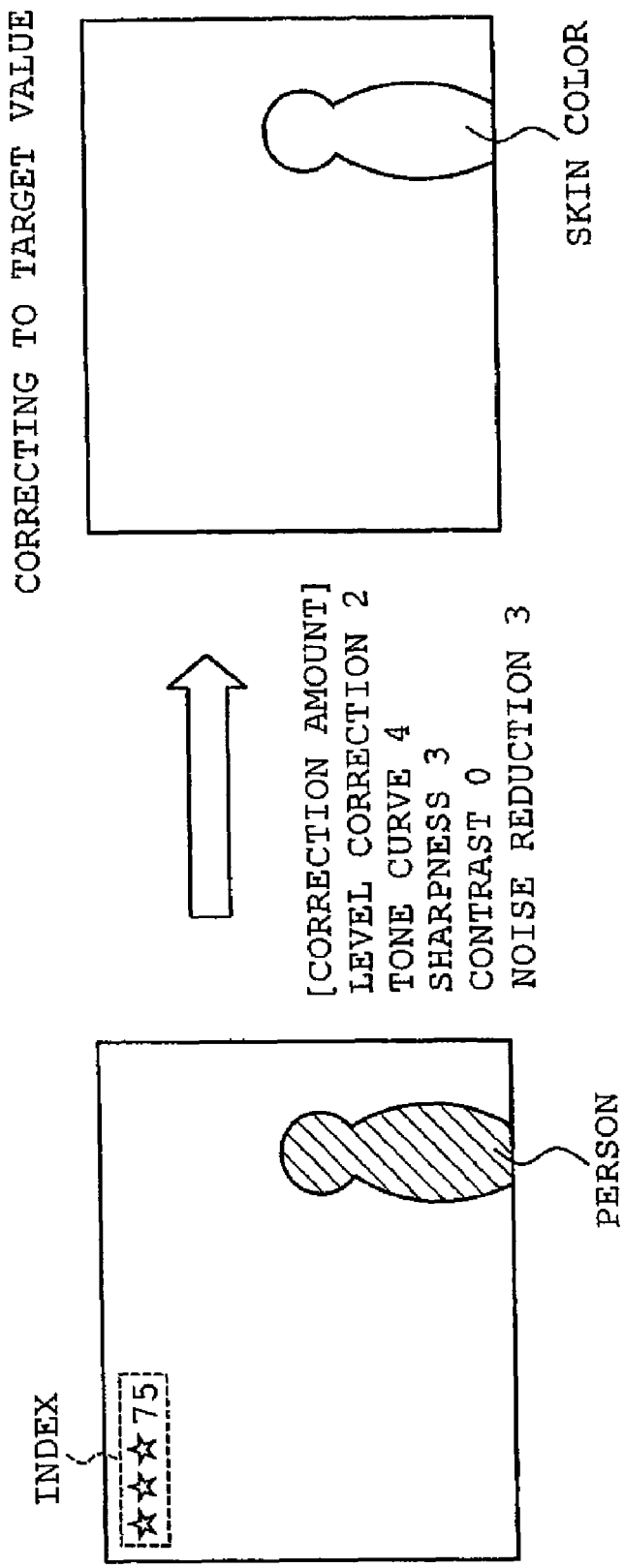
FIG. 6 is an example of displayed contents in the case where the index is used in a retouching process.

Furthermore, the index can also be used in a retouching process, for example. FIG. 6 shows an example of display in the case where the index is used in a retouching process. Since an image to be analyzed has already been selected in the retouching process, the processing of steps S200 to S400 as shown in FIG. 4 is repeatedly carried out every time retouching is executed. More specifically, every time the user caries out an image adjustment, an index is obtained which corrects adjusted image data so that the adjusted image data corresponds to a target value. The obtained index is displayed on the display. In this case, when a concrete value is displayed which is used for an image adjusting process necessary to correct the adjusted image to a target value, the concrete value gives an indication in the retouch.

Furthermore, there is a case where a target value of the initial setting does not meet user's preference. In view of the case, the retouching process is linked to the correction value obtainment process so that a result of retouch carried out by the user on a retouch application is stored (a user correction amount storage unit) and the retouch result is set as a new target value (a target value modification unit). For example, FIG. 7 shows a slightly darker image of a figure (index 85). When retouch has been carried out to modify the skin color of the figure so that the skin color becomes darker than an initially set target value (index 95), a modification value in the retouch is stored. Subsequent target values are modified on the basis of the modification value. Consequently, an index in the retouch is suitable for user's preference, and correction suitable for user's preference is carried out in the printing or displaying process. Additionally, only the contents of retouch by the user may be reflected every time of the retouch by the user. Alternatively, the history of user's retouch may be stored so as to be reflected comprehensively.

The present invention should not be limited by the foregoing embodiment and modified forms. The invention may include an arrangement obtained by substitution or change in the combination of arrangements disclosed in the embodiment or modified forms. Furthermore, the invention may include an arrangement obtained by substitution or change in the combination of arrangements disclosed in the embodiment or modified forms or the conventional art.

While the invention has been particularly shown and described with respect to preferred embodiments thereof, it should be understood by those skilled in the art that the foregoing and other changes in form and detail may be made therein without departing from the spirit and scope of the invention as described in the appended claims.

What is claimed is:

1. An image processing device capable of executing adjustment of image quality of image data, comprising:
a feature amount obtainment unit which obtains an amount of feature indicative of a feature of image quality of the image data;
a correction amount obtainment unit which obtains an amount of correction for adjusting the feature amount of the image data to a predetermined target value; and
an image quality evaluation unit which evaluates an image quality based on the correction amount
wherein when a file group includes at least JPEG data and RAW data both derived from same image data, the feature amount obtainment unit obtains the feature amount based on the JPEG data, the image processing device further comprising a file selection unit which selects the JPEG data as a target to be output when a result of evaluation by the image quality evaluation unit is higher than a predetermined level, the file selection unit selecting the RAW data as the target to be output when the result of evaluation by the image quality evaluation unit is lower than the predetermined level.

2. The image processing device according to claim 1, wherein the file selection unit selects as a target to be output a file regarding which a result of evaluation is in a predetermined range.

3. The image processing device according to claim 1, further comprising a display unit which displays a result of evaluation by the image quality evaluation unit together with the image data.

4. The image processing device according to claim 1, wherein the correction amount obtainment unit obtains the correction amount for each of a plurality of image quality adjustments, and the image quality evaluation unit weights a degree of image degradation due to each image quality adjustment to each correction amount and sums each correction amount weighted by the image degradation degree, thereby comprehensively evaluating the image quality after image adjustment.

5. An image processing device capable of executing adjustment of image quality of image data, comprising:

a feature amount obtainment unit which obtains an amount of feature indicative of a feature of image quality of the image data;

a correction amount obtainment unit which obtains an amount of correction for adjusting the feature amount of the image data to a predetermined target value;

an image quality evaluation unit which evaluates an image quality based on the correction amount; and a user correction amount storage unit which stores a user amount of correction based on a result of retouch with the image data by the user and a target value modification unit which modifies the predetermined target value based on the user correction amount.

6. An image processing program embodied in a non-transitory computer readable medium which is capable of executing adjustment of image quality of image data and on which a computer executes functions of:

obtaining an amount of feature indicative of a feature of image quality of the image data;

obtaining an amount of correction in image quality adjustment based on comparison of the feature amount and a target image quality; and evaluating an image quality based on the correction amount, wherein when a file group includes at least JPEG data and RAW data both derived from same image data, the feature amount is obtained based on the JPEG data, the JPEG data is selected as a target to be output when a result of the image quality evaluation is higher than a predetermined level, and the RAW data is selected as the target to be output when the result of the image quality evaluation is lower than the predetermined level.

* * * * *